US006182280B1

(12) United States Patent
Bunker et al.

(10) Patent No.: US 6,182,280 B1
(45) Date of Patent: Jan. 30, 2001

(54) INVERSE ASSEMBLER WITH REDUCED SIGNAL REQUIREMENTS WITH A USER SUPPLIED MEMORY MAP

(75) Inventors: Christopher Bunker, Colorado Springs; John Sparks, Monument, both of CO (US)

(73) Assignee: Agilent Technologies, Palo Alto, CA (US)

( * ) Notice: Under 35 U.S.C. 154(b), the term of this patent shall be extended for 0 days.

(21) Appl. No.: 09/113,238

(22) Filed: Jul. 10, 1998

(51) Int. Cl.[7] ....................................................... G06F 9/45
(52) U.S. Cl. .................................... 717/4; 703/28
(58) Field of Search ........................ 395/704, 705; 714/25, 30, 31, 32, 33, 35, 38, 39, 45; 712/227; 703/13–15, 23, 27, 28; 717/4, 5

(56) References Cited

U.S. PATENT DOCUMENTS

| 4,636,940 | * | 1/1987 | Goodwin, Jr. | 395/704 |
| 4,641,348 | | 2/1987 | Neuder et al. | 382/1 |
| 4,694,420 | | 9/1987 | Pettet et al. | 364/900 |
| 5,321,828 | * | 6/1994 | Phillips et al. | 395/500 |
| 5,737,520 | | 4/1998 | Gronlund et al. | 395/183.15 |
| 5,841,670 | * | 11/1998 | Swoboda | 395/500.44 |
| 5,884,023 | * | 3/1999 | Swoboda et al. | 714/30 |

OTHER PUBLICATIONS

Strassberg, "Logic analyzers stamping out bugs", EDN, Apr. 1997, pp 73–84.*
Schpike, "Design embedded systems for probing" Test & measurement world, Nov. 1997, pp 55–58.*
Woodward, "PC systems transform debugging tools", EE times, Apr. 1998, pp 94.*

* cited by examiner

Primary Examiner—Kakali Chaki
(74) Attorney, Agent, or Firm—Steven L. Webb

(57) ABSTRACT

An inverse assembler that uses a memory map as a substitute for some microprocessor status signals. This reduces the number of signals needed from a microprocessor to perform disassembly.

16 Claims, 3 Drawing Sheets

Memory Map

| Memory regions | Base Address | End Address | Memory Width | Instruction Type |
|---|---|---|---|---|
| Region 1 | 00000000 | 00007FFF | 8 bits | Instruction ARM |
| Region 2 | 00008000 | 0000FFFF | 8 bits | Data |
| Region 3 | 00010000 | 00017FF | 8 bits | Instruction Thumb |
| Region 4 | 00018000 | 0001FFFF | 8 bits | Instruction Thumb |
| Region 5 | 00000000 | 00000000 | UNKNOWN | 00000000 |
| Region 6 | 00000000 | 00000000 | UNKNOWN | 00000000 |
| Region n | 00000000 | 00000000 | UNKNOWN | 00000000 |

Figure 3

INVERSE ASSEMBLER WITH REDUCED SIGNAL REQUIREMENTS WITH A USER SUPPLIED MEMORY MAP

RELATED APPLICATIONS

This application is related to the application "Inverse Assembler with Reduced Signal Requirements using a Trace Listing" that has the H.P. docket number 10981522 and was filed on the same day as this application.

FIELD OF THE INVENTION

The present invention relates generally to electronic test equipment and more particularly to a logic analyzer that can do mnemonic disassembly of the commands of a microprocessor by substituting information from a user defined memory map as a replacement for some of the signals from the microprocessor.

BACKGROUND OF THE INVENTION

Microprocessors are used on circuit boards to control or perform a large variety of functions. One of these functions is the set up and control of application specific integrated circuits (ASIC). The microprocessor controls the ASIC by running a program that is stored or downloaded into memory. The program or firmware that is run on the microprocessor needs to be analyzed to make sure that the program is running correctly. Typically the microprocessor is in its own integrated circuit (IC) connected to the ASIC by the circuit board. Because the microprocessor is in its own IC all of the signals going to and coming from the microprocessor are available for probing by logic analyzers or other test equipment.

A logic analyzer can use the signals coming from the microprocessor to create a listing of mnemonic program code indicative of those signals. This process is called inverse assembly or disassembly and is done by the inverse assembler inside a logic analyzer. This process allows the code to be checked or debugged in its mnemonic form instead of trying to debug the code in hexadecimal or binary format.

There is a trend to incorporate the microprocessor into the ASIC. This reduces the cost of the system by eliminating an IC, reducing signal lines and reducing board real estate by combining or embedding the microprocessor into the ASIC. This embedded microprocessor still needs to have its signals available for analysis so that the program running on it can be analyzed and debugged. One of the limiting factors on an ASIC is the number of pins or signals that are available to enter or exit from the IC package. Currently all the signals for disassembly of the microprocessor program are required to be available external to the ASIC. This consumes more of the available pins or signals of the ASIC than is desired. There is a need to reduce the required number of signals from the embedded microprocessor to allow for disassembly of those signals into the program used to run the microprocessor.

SUMMARY OF THE INVENTION

The present invention provides an inverse assembler that uses a memory map as a substitute for some microprocessor status signals. This reduces the number of signals needed from a microprocessor to perform disassembly.

BRIEF DESCRIPTION OF THE DRAWINGS

FIG. 3 is a memory map according to the present invention.

DETAILED DESCRIPTION OF THE PREFERRED EMBODIMENT

Figure 1:
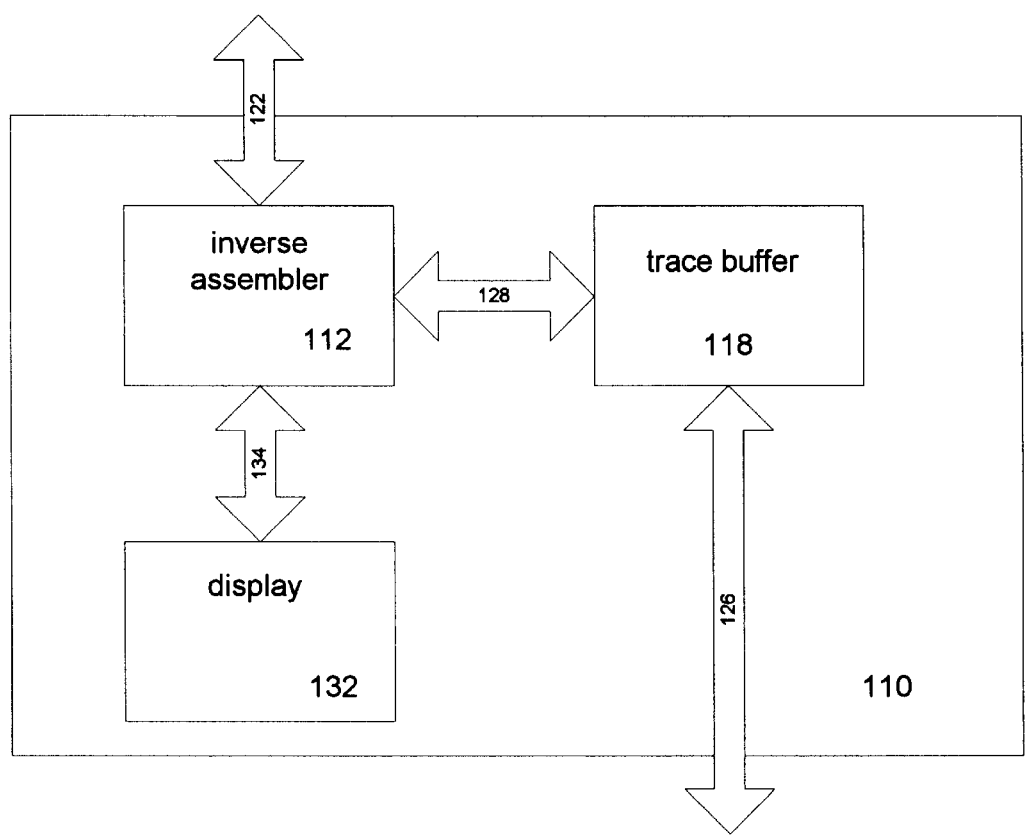
FIG. 1 is a partial block diagram of a logic analyzer.

FIG. 1 shows a partial block diagram of a logic analyzer 110 that contains an inverse assembler 112. The inverse assembler 112 is connected to a user interface (not shown) by a connecting means 122 such that a user can input data into the inverse assembler 112. The inverse assembler 112 is also connected to a trace buffer 118 by connecting means 128 such that the inverse assembler has access to all locations of the trace buffer 118. The trace buffer 118 is connected to a microprocessor signal acquisition apparatus (not shown) by connecting means 126 such that status signals from a microprocessor to be tested, can be stored in the trace buffer 118. The inverse assembler 112 is also connected to a display 132 by connecting means 134 such that the inverse assembler 112 can display its results to a user. In the preferred embodiment the inverse assembler 112 is contained within a logic analyzer, however the inverse assembler could be contained within other devices, for example a personal computer. All that is needed is a way for the user to input the data for the memory map and the signal availability table, a memory location to store a trace buffer listing and a processor to run the inverse assembler. A personal computer has a user input device (the keyboard), a memory location (random access memory or the hard disk) that can be used to store a trace buffer listing, and a microprocessor that can run the inverse assembler.

Figure 2:
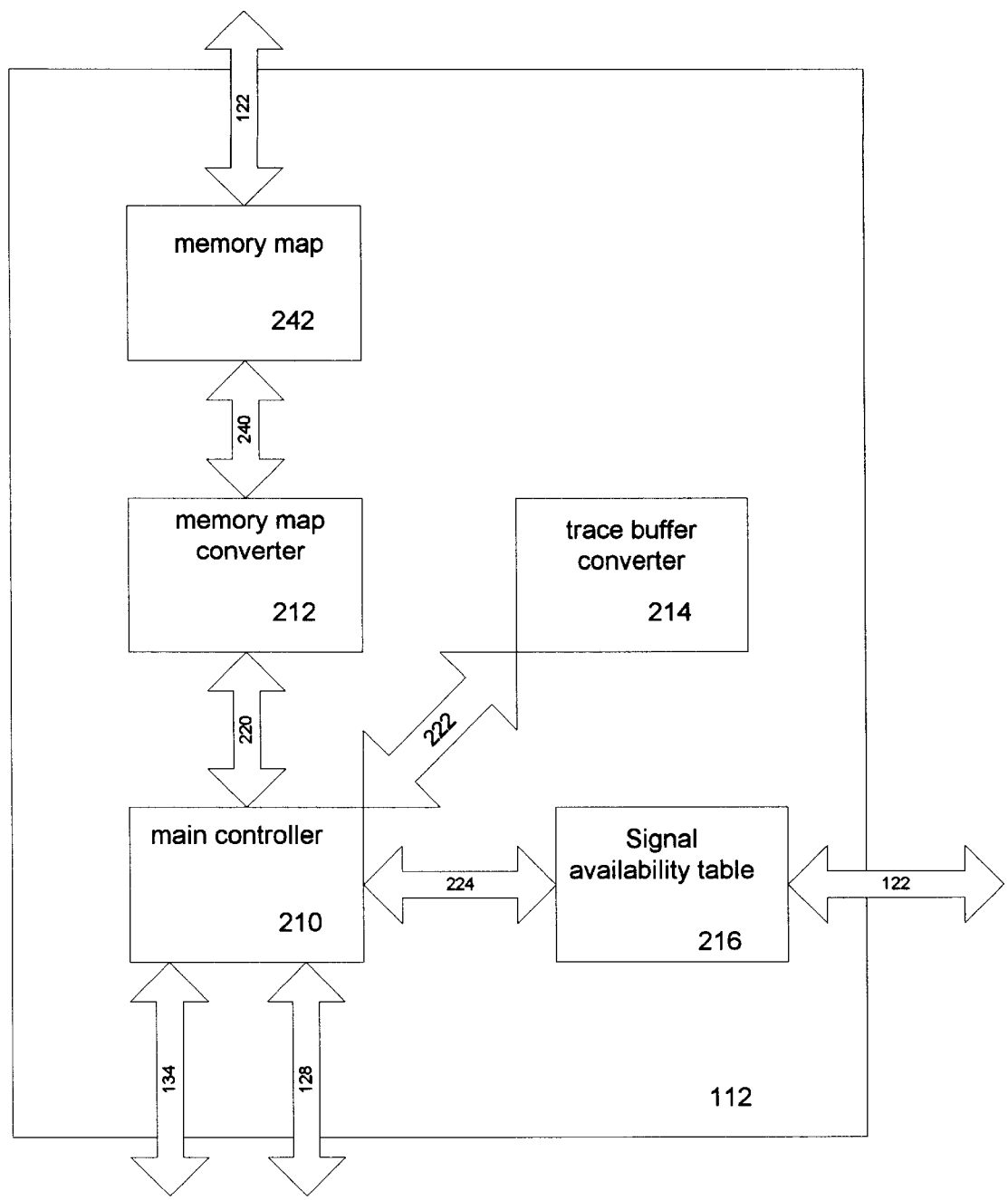
FIG. 2 is a partial block diagram of an inverse assembler contained in a logic analyzer.

FIG. 2 is a partial block diagram of the inverse assembler 112, which contains a main controller 210. The main controller 210 is connected to a memory map converter 212 by connecting means 220 such that the main controller 210 can initiate and then access the results of the memory map converter 212. Memory map converter 212 is connected to a memory map 242 by a connecting means 240 such that the memory map converter 212 has access to the information in the memory map 242. The memory map 242 is connected to a user interface (not shown) by a connecting means 122 such that a user can input data into the memory map 242. The main controller 210 is also connected to a trace buffer converter 214 by connecting means 222 such that the main controller 210 can initiate and then access the results of the trace buffer converter 214. The main controller 210 is also connected to the signal availability table 216 by connecting means 224 such that the main controller 210 has access to the information contained in the signal availability table 116. The signal availability table 216 is connected to a user interface (not shown) by connecting means 122 such that a user can fill the signal availability table. The main controller 210 is also connected to the trace buffer 118 by connecting means 128 such that the main controller 210 can access the data at any location inside the trace buffer 118. The main controller 210 is also connected to a display 132 by connecting means 134 such that the main controller 210 can display the results of the inverse assembler 112 to the user. A connecting means can be any method used to transfer data between two or more locations or processes. For example the circuit traces on a printed circuit board between an ASIC and a microprocessor is a connecting means. Another example of a connecting means is the memory location used to pass data between two or more functions or processes running on a computer or microprocessor.

A microprocessor is able to address a range of locations. Different areas of this range of address locations are used for different functions. Some of the different functions are data locations and program instruction locations. A table or listing of the different address spaces and their corresponding functions, i.e. data or program instructions, is called a memory map for that microprocessor. The memory map can also include the type of the program instruction. FIG. 3 shows a memory map containing a plurality of memory regions. Each memory region has a user definable base address and end address. The type field is selectable between program instructions and data fetches. When the microprocessor has a plurality of instruction sets where each instruction set is a different size (fill word, half word, or double word) the type field is selectable between full word instructions sets, half word instruction sets, and double word instruction sets. In the preferred embodiment for use with an ARM7 microprocessor made by Advanced RISC Machines Limited, the microprocessor has two sets of program instructions. The word instructions are 32 bits in length and are called ARM instructions. The half word instructions are 16 bits in length and are called THUMB instructions. Because the microprocessor in the preferred embodiment has two instruction sets the type field of the memory map is selectable between ARM instructions, THUMB instructions, and data fetches. When the type field is set to ARM instructions the instruction size is 32 bits. When the type field in the memory map is set to THUMB instructions the instruction size is 16 bits.

The type of memory device that is being used determines the memory width field of the memory map. For example flash memory is typically 8 or 16 bits wide. dynamic random access memory (DRAM) is typically 32 bits in width. The user of the logic analyzer supplies the memory map for the microprocessor to be tested.

An inverse assembler is configured to read the microprocessor status signals or lines coming from a microprocessor to be tested and disassembles this information into the program code that created those status signals. These microprocessor status signals are typically stored in the trace buffer for access by the inverse assembler. The signal availability table is a listing of the signals coming from the microprocessor. Each signal can be designated as connected or not connected. When the microprocessor signal is designated as "not connected" that means that that signal is unavailable for use by the inverse assembler. The user of the logic analyzer supplies the signal availability table for the system to be tested.

One of the microprocessor status signals used in typical inverse assemblers is nOPC. The small 'n' means that this signal is active low and the 'OPC' stands for operation code or opcode. This signal is used to determine the difference between program instruction and data accesses or fetches. Using a memory map and the microprocessor address status signals or lines, the state of the nOPC signal can be determined.

When the main controller 210 determines from the signal availability table 216 that the nOPC signal is designated as "not connected" the memory map converter 212 is used to determine the nOPC signal. The main controller 210 accesses the address status signals from the trace buffer 118 using connecting means 128. The main controller 210 then sends this address to the memory map converter 212 using connecting means 220. The memory map converter 212 transforms the address using the memory map 114 by way of connecting means 120, into the state of the status signal nOPC. The main controller 210 then retrieves the state of status signal nOPC. For example, the address lines of a microprocessor using the memory map defined in FIG. 3, are at 600H for trace state X. Address 600H is within the address range defined by the base address and end address for region 1. Therefore trace state X is within range 1 and is an ARM instruction. ARM instructions are 32 bit width program instruction fetches. Therefore nOPC would be in the state that indicates an instruction fetch. The address bus of the microprocessor is at 8500H for trace state Y. Address 8500H is within the address range defined by the base address and end address for region 2. Therefore trace state Y is a data access. For data accesses nOPC would be in the state that indicates a data fetch for trace state Y. For any microprocessor trace buffer state Z the address of that instruction can be mapped into the corresponding address range in the memory map and the state of the nOPC signal can be determined. Because the state of the nOPC signal can be determined using the memory map and he address bus of the microprocessor, the nOPC signal is no longer needed to perform inverse assembly.

Another signal typically used by inverse assemblers is the status signal that indicates the microprocessor memory access size (MAS). This signal is typically two bits in width with a binary encoding such that when both bits are zero (00) the instruction size is 8 bits. Typically when the lower bit in MAS is one (01) the instruction size is 16 bits and when the upper bit in MAS is one (10) the instruction size is typically 32 bits. When both bits of MAS are one (11) it is an undefined state. The lower bit or least significant bit in the MAS signal is typically called bit zero and the upper or most significant bit is called bit one.

When the main controller 210 determines from the signal availability table 216 that the MAS signal is designated as "not connected" the main controller determines the MAS signal in two different ways dependent on whether the instruction being disassembled is a program instruction or a data fetch.

When the main controller 210 determines that the instruction being disassembled is a program instruction, either using the nOPC signal or the memory map converter 212, the main controller uses the memory map converter 212 to determine the state of the MAS status signal. The main controller 210 accesses the address status signals from the trace buffer 118 using connecting means 128. The main controller 210 then sends this address to the memory map converter using connecting means 220. The memory map converter 212 transforms the address using the memory map 114 by way of connecting means 120, into the state of the status signal MAS. The main controller 210 then retrieves the state of status signal MAS. For example, the address lines of a microprocessor using the memory map defined in FIG. 3, are at 600H for instruction X. Address 600H is within the address range defined by the base address and end address for region 1. Therefor instruction X is within range 1 and is an ARM instruction. ARM instructions are 32 bit width program instruction fetches. Therefore MAS would be in the state that indicates a 32-bit width instruction fetch. The address bus of the microprocessor is at 10500H for instruction Q. Address 10500H is within the address range defined by the base address and end address for region 3. Therefore instruction Q is a THUMB instruction. For THUMB instructions MAS would be in the state that indicates a 16-bit width instruction fetch. For any microprocessor program instruction R the address of that program instruction can be mapped into the corresponding address range in the memory map and the state of the MAS signal can be determined.

A microprocessor that has a load/store architecture is a microprocessor that for every memory or data access (read or write command) there is a corresponding load or store instruction. These corresponding load or store instructions typically occur earlier in the program. In the preferred embodiment using an ARM7 microprocessor that has a three-stage pipeline, for each data access (read/write), the originating load/store instruction is exactly three program instructions before the data access or read/write command. The load/store instructions that correspond to the read/write instructions contain information that indicates the size of the data access or read/write command. In the preferred embodiment using an ARM7 microprocessor there are three types of load/store instructions. The first type is 32-bit load/store instruction designated by the opcodes LDR/STR. The second type is 16-bit load/store instruction designated by the opcodes LDRH/STRH. The third type is 8-bit load/store instruction designated by the opcodes LDRB/STRB. The data access size information allows the state of the MAS status signals for the data access (read/write) to be determined.

When the main controller 210 determines that the instruction being disassembled is a data fetch or data access, either using the nOPC signal or the memory map converter 212, the main controller uses the trace buffer converter 214 to determine the state of the MAS status signal. The main controller 210 accesses the microprocessor status signals from the trace buffer 118 using connecting means 128. The main controller 210 then sends these signals to the trace buffer converter 214 using connecting means 220. The trace buffer converter 214, using the microprocessor status signals and the load/store architecture of the microprocessor, transforms the status signals into the state of the status signal MAS. The main controller 210 then retrieves the state of status signal MAS.

For example the trace buffer converter 214 would determine the state of the MAS status signals for state 3482 in the trace buffer listing contained in Appendix 1. Appendix 1 is a trace buffer listing from an ARM7 microprocessor, using the memory map of FIG. 3, showing a plurality of state numbers in column 410. A plurality of microprocessor addresses in column 412, corresponding to the state numbers in column 410. A plurality of disassembled mnemonic program instructions in column 414, corresponding to the state numbers in column 410. And a plurality of data states in column 416, corresponding to the state numbers in column 410. The inverse assembler 112 has determined that state 3482 is a data fetch or data access by either using the nOPC signal or the memory map converter 212.

The memory width field in the memory map is used to determine how many trace buffer states correspond to each program instruction or data fetch. In the preferred embodiment using an ARM7 microprocessor a program instruction or data fetch may correspond to between 1 and 4 trace buffer states. For example the address of trace state 3482 is within the range of region 1 of the memory map in FIG. 3. Region 1 has a memory width of 8 bits and is a 32-bit program instruction. 32 bits divided by 8 bits equals 4. Therefore there will be 4 trace buffer states that contain the data for the program instruction starting at trace state 3482. The 4 trace states that correspond to the program instruction starting at state 3482 are 3482, 3484, 3486 and 3488.

The trace buffer converter 214 using the trace buffer listing, counts from state 3482 backwards for three program instructions, each program instruction corresponding to 4 trace buffer states. State 3474 is the start of the first program instruction, state 3466 is the start of the second program instruction, and state 3458 is the start of the third program instruction before state 3482. Therefore state 3458 is the load instruction that corresponds to the data access of state 3482. The instruction contained in state 3458 is a LDR or 32 bit load instruction. Therefore the data access for state 3482 is 32 bits and the MAS status signals for state 3482 would be (10) corresponding to a 32-bit data access.

The inverse assembler 112 has determined that state 3499 is a data fetch or data access by either using the nOPC signal or the memory map converter 212. The trace buffer converter 214 using the trace buffer listing, counts from state 3499 backwards for three program instructions. State 3491 is the first program instruction. State 3482 is a data access not a program instruction (determined either by the nOPC status signal or the memory map converter) so state 3482 does not count as one of the three program instructions. State 3474 is the second program instruction, and state 3466 is the third program instruction before state 3499. Therefore state 3466 is the load instruction that corresponds to the data access of state 3499. The instruction contained in state 3466 is a LDRB or 8 bit load instruction. Therefore the data access for state 3499 is 8 bits and the MAS status signals for state 3499 would be (01) corresponding to an 8-bit data access.

The inverse assembler 112 has determined that state 3559 is a data fetch or data access by either using the nOPC signal or the memory map converter 212. The trace buffer converter 214 using the trace buffer listing, counts from state 3559 backwards for three program instructions. State 3551 is the first program instruction. State 3542 is a data access not a program instruction so state 3542 does not count as one of the three program instructions. State 3534 is the second program instruction, and state 3526 is the third program instruction before state 3559. Therefore state 3526 is the store instruction that corresponds to the write or data access of state 3559. The instruction contained in state 3526 is a STRB or 8 bit store instruction. Therefore the data access for state 3559 is 8 bits and the MAS status signals for state 3559 would be (00) corresponding to an 8-bit data access.

For any given data access the trace buffer converter can count backwards through the trace information for three program instructions and determine the corresponding load or store instruction. By using the data access size information contained in this load or store instruction the state of the MAS status signals for the originating data access can be determined. Therefore this microprocessor status signal is no longer needed for inverse assembly.

Another microprocessor status signal used by inverse assemblers is the nRW status signal. The small 'n' indicates that this signal is active low. The RW indicates that this signal determines if the data access is either a read or write. A read data access would correspond to a load instruction and a write data access would correspond to a store instruction in the ARM7 microprocessor.

When the main controller 210 using the signal availability table 216, determines that the nRW signal is marked "not available" the main controller 210 will use the trace buffer converter 214 to determine the nRW status signal. When the main controller 210 determines that the instruction being disassembled is a data fetch or data access, either using the nOPC signal or the memory map converter 212, the main controller uses the trace buffer converter 214 to determine the state of the nRW status signal. The main controller 210 accesses the microprocessor status signals from the trace buffer 118 using connecting means 128. The main controller 210 then sends these signals to the trace buffer converter 214 using connecting means 220. The trace buffer converter 214, using the microprocessor status signals and the load/store architecture of the microprocessor, transforms the status signals into the state of the status signal nRW. The main controller 210 then retrieves the state of status signal nRW.

For example the trace buffer converter 214 would determine the state of the nRW status signals for state 3482 in the trace buffer listing contained in Appendix 1. The inverse assembler 112 has determined that state 3482 is a data fetch or data access by either using the nOPC signal or the memory map converter 212. The trace buffer converter 214 using the trace buffer listing, counts from state 3482 backwards for three program instructions. State 3474 is the first program instruction, state 3466 is the second program instruction, and state 3458 is the third program instruction before state 3482. Therefore state 3458 is the load instruction that corresponds to the data access of state 3482. Because load instructions correspond to read instructions and state 3458 is a load instruction then state 3482 is a read instruction and the status signal nRW for state 3482 would indicate a read state.

For any given data access the trace buffer converter 214 can count backwards through the trace information for three program instructions and determine the corresponding instruction. By determining whether the corresponding instruction is a load or a store instruction the nRW state for the originating data access can be determined. Therefore this microprocessor status signal is no longer needed for inverse assembly.

Another signal used by inverse assemblers is the nWait status signal. The small 'n' indicates that this signal is active low. The Wait indicates that this signal determines if the microprocessor is executing a wait instruction.

When the main controller 210 using the signal availability table 216, determines that the nWait signal is marked "not available" the main controller 210 will use the trace buffer converter 214 to determine the nWait status signal. The main controller 210 accesses the microprocessor status signals from the trace buffer 118 using connecting means 128. The main controller 210 then sends these signals to the trace buffer converter 214 using connecting means 220. The trace buffer converter 214, using the microprocessor status signals transforms the status signals into the state of the status signal nWait. The main controller 210 then retrieves the state of status signal nWait.

The trace buffer converter 214 determines the state of the status signal nWait by looking at the address information in the trace record. Any sequence of addresses that contain a plurality of consecutive identical addresses indicates a wait state and a corresponding active status signal nWait. The wait state status signal is active for all identical addresses up to but excluding the last identical address. For example the address in state 3504 in the trace listing of Appendix 1 is 1575H. The address of state 3505 is also 1575H. Because state 3504 address is identical to the consecutive state 3505 then the nWait signal for state 3504 would be active. Because state 3505's address is the last state in the sequence of identical addresses, state 3505 would not have an active nWait status signal. State 3549 through state 3551, in the trace listing shown in Appendix 1, have the identical address of 1594H. Therefor State 3549 and state 3550 would have active nWait status signals. State 3551, because it is the last state with the identical address, would have an inactive nWait status signal. The status of the nWait signal for any state can be determined by the addresses of the previous states. Therefore this microprocessor status signal is no longer needed for inverse assembly.

What is claimed is:

1. In an inverse assembler, a system for microprocessor status signal deduction comprising:
  a memory map converter configured to transform information of a memory map and a trace buffer into a microprocessor status signal that is unavailable for use by the inverse assembler by accessing an address of the microprocessor status signal from the trace buffer and converting the address into a state of the microprocessor status signal.

2. The system of claim 1 where the inverse assembler is contained within a logic analyzer.

3. The system of claim 1 wherein the inverse assembler is contained by a personal computer.

4. The system of claim 1, wherein the memory map converter accesses an address of the microprocessor status signal from the trace buffer and converts the address into the state of the microprocessor status signal.

5. The system of claim 4, wherein the memory map converter converts the address into the state of the microprocessor status signal by mapping the address into a corresponding address range in the memory map that indicates the state of the microprocessor status signal.

6. In an inverse assembler, a system for microprocessor status signal deduction comprising:
  a memory map;
  a trace buffer; and
  means for converting information of the memory map and the trace buffer into a state of a microprocessor status signal that is unavailable for use by the inverse assembler, wherein the means for converting accesses an address of the microprocessor status signal from the trace buffer and converts the address into the state of the microprocessor status signal.

7. The system of claim 6 where the inverse assembler is contained within a logic analyzer.

8. The system of claim 6 wherein the inverse assembler is contained by a personal computer.

9. The system of claims 1, 7, 8, 3, or 6 where the microprocessor status signal deduced is nOPC.

10. The system of claims 1, 7, 2, 8, 3, or 6, where the microprocessor status signal deduced is MAS for program instructions.

11. The system of claim 6, wherein the means for converting converts the address into the state of the microprocessor status signal by mapping the address into a corresponding address range in the memory map that indicates the state of the microprocessor status signal.

12. A method of determining a state of a microprocessor status signal that is unavailable for use by an inverse assembler, comprising:
  determining that the microprocessor status signal is unavailable for use by the inverse assembler;
  accessing an address of the microprocessor status signal;
  transforming the address of the microprocessor status signal into a state of the microprocessor status signal.

13. The method of claim 12, wherein transforming the address of the microprocessor status signal into the state further comprises:
  mapping the address into a corresponding address range in a memory map that indicates the state of the microprocessor status signal.

14. The method of claim 12, further comprising:
  retrieving the state of the microprocessor status signal.

15. The method of claim 12, wherein determining that the microprocessor status signal is unavailable is accomplished by a controller determining availability from a signal availability table of the inverse assembler.

16. The method of claim 12, wherein the address is accessed from a trace buffer by a controller of the inverse assembler.

* * * * *